(12) United States Patent
Veux et al.

(10) Patent No.: US 7,104,300 B2
(45) Date of Patent: Sep. 12, 2006

(54) SEALING STRIP FOR A RIM OF A WHEEL AND A RIM HAVING A SEALING STRIP

(75) Inventors: Jean-Luc Veux, Rumilly (FR); Gilles Parquet, Menthonnex en Bornes (FR)

(73) Assignee: Salomon S.A., Metz-Tessy (FR)

( * ) Notice: Subject to any disclaimer, the term of this patent is extended or adjusted under 35 U.S.C. 154(b) by 42 days.

(21) Appl. No.: 10/715,539

(22) Filed: Nov. 19, 2003

(65) Prior Publication Data

US 2004/0095014 A1   May 20, 2004

(30) Foreign Application Priority Data

Nov. 20, 2002   (FR)   ................................. 02 14910

(51) Int. Cl.
 *B60B 21/10*   (2006.01)
 *B60B 1/02*   (2006.01)
 *B60C 19/00*   (2006.01)

(52) U.S. Cl. ....................... 152/379.4; 152/513; 301/58

(58) Field of Classification Search .................. 301/55, 301/58, 95.101, 95.104, 95.106, 95.107, 301/56; 152/379.4, 381.4–381.6, 383, 379.3, 152/379.5, 513, 399–401
See application file for complete search history.

(56) References Cited

U.S. PATENT DOCUMENTS

| 1,820,857 | A | * | 8/1931 | Wilson | ................... | 152/501 |
|---|---|---|---|---|---|---|
| 3,008,770 | A | * | 11/1961 | Mueller | ............... | 301/95.106 |
| 3,965,957 | A |  | 6/1976 | Nakasaki | ............... | 152/400 |
| 3,999,587 | A |  | 12/1976 | Mitchell | ............... | 152/379 S |
| 4,108,232 | A |  | 8/1978 | Simpson | ................. | 152/365 |
| 4,602,665 | A | * | 7/1986 | Sacks | .................. | 152/375 |
| 4,930,558 | A | * | 6/1990 | Sahagian | ............. | 152/339.1 |
| 5,538,058 | A |  | 7/1996 | Aloy | ................... | 152/381.5 |
| 6,019,149 | A | * | 2/2000 | Stringer | ............... | 152/381.5 |
| 6,145,937 | A | * | 11/2000 | Chen | ........................ | 301/58 |
| 6,155,651 | A | * | 12/2000 | Mizata et al. | ......... | 301/95.104 |
| 6,257,676 | B1 |  | 7/2001 | Lacombe et al. | ........ | 301/58 |
| 6,318,428 | B1 | * | 11/2001 | Lo | ........................ | 152/381.4 |
| 6,402,256 | B1 |  | 6/2002 | Mercat | ............... | 301/95.104 |
| 6,428,115 | B1 | * | 8/2002 | Chen | ................. | 301/95.106 |
| 6,443,533 | B1 |  | 9/2002 | Lacombe et al. | ..... | 301/95.104 |
| 6,782,931 | B1 | * | 8/2004 | Koziatek | ............... | 152/502 |

FOREIGN PATENT DOCUMENTS

DE           3715669           1/1988

(Continued)

*Primary Examiner*—Jason R. Bellinger
(74) *Attorney, Agent, or Firm*—Greenblum & Bernstein, P.L.C.

(57) ABSTRACT

A sealing strip to be used with the rim of a wheel, particularly the rim of a so-called box section bicycle rim, as well as a rim equipped with such a sealing strip, and a wheel having such rim and sealing strip. The sealing strip is formed by a continuous annular strip having, in cross section, a median depression, forming a U-shaped radial groove provided to be positioned within in the central well of the rim, two lateral extensions provided to be supported upon on the interior edges of the rim that border of the well, and two lateral walls provided to extend along the flanges of the rim. The walls of the sealing strip are extended by a pair of lips that project toward the inside relative to the walls of the sealing strip, the lips being adapted to be positioned adjacent the lips of the rim.

26 Claims, 4 Drawing Sheets

FOREIGN PATENT DOCUMENTS

| | | |
|---|---|---|
| DE | 20108416 | 10/2001 |
| EP | 0615865 | 9/1994 |
| EP | 0893280 | 1/1999 |
| FR | 2744953 | 8/1997 |
| FR | 2766419 | 1/1999 |
| FR | 2787064 | 6/2000 |
| GB | 5044189 | 10/1980 |
| GB | 2068853 | 8/1981 |

* cited by examiner

SEALING STRIP FOR A RIM OF A WHEEL AND A RIM HAVING A SEALING STRIP

CROSS-REFERENCE TO RELATED APPLICATION

This application is based upon French Patent Application No. 02.14910, filed Nov. 20, 2002, the disclosure of which is hereby incorporated by reference thereto in its entirety and the priority of which is hereby claimed under 35 U.S.C. §119.

BACKGROUND OF THE INVENTION

1. Field of the Invention

The invention relates to a sealing strip to be used with the rim of a wheel, such as the rim of a bicycle wheel, as well as to a rim equipped with such a sealing strip. The invention also relates to a wheel, particularly a bicycle wheel, having a rim equipped with such a sealing strip.

More specifically, the invention relates to a sealing strip that is provided to facilitate the mounting of a tubeless tire.

2. Description of Background and Relevant Information

Traditionally, a rim has an outer annular channel provided to receive a pneumatic tire, and the bridge that demarcates the base of this channel is bored with openings that are used to position the spoke nipples or the spokes themselves according to the spoke arrangement that is implemented for the wheel.

The use of a tubeless tire mounted upon the rim has advantages including, in particular, less weight of the complete wheel, less inertia, a better contact of the wheel with the ground and, consequently, an improved grip with the surface of the ground, and less risk of a flat because of a reduced risk of pinching.

There are wheels for tubeless tires for which the upper bridge is not bored with openings for spokes. Because this bridge is not bored, it is therefore air impermeable. Such a construction is described, for example, in the patent publication EP 893 280 and U.S. Pat. No. 6,257,676.

For conventional rims whose upper bridge is bored with openings, it has been desired to cover this bridge with a strip of material that blocks the openings of the bridge in a manner that is air impermeable.

Such constructions are described, for example, in patent documents DE 37 15 669, EP 615 865, U.S. Pat. No. 5,538,058, FR 2 744 953, and DE 201 08 416. There are also devices commercially made by MAXXIS®, TREK®, and PANARACER®.

Existing systems yield good results; however, they are not completely satisfactory. Indeed, there are numerous problems to overcome.

First of all, there is the mounting of the strip of material itself on the rim, its retention on the rim, and the mounting of the tire. Secondly, there is the problem of inflating the tire and, more particularly, the problem of inflating with a pump having a low output, i.e., a light-duty pump.

Additionally, there is the problem of the seal, or impermeability, between the tire and the base of the rim.

The shape of a rim that has, on the outside, the shape described in EP 893 280 and U.S. Pat. No. 6,257,676 has yielded good results with regard to primary inflation. However, it has been noted that, particularly in the case of high pressure, the tire beads can rise out of their seatings. There is then the risk that the bead can locally separate from the base of the rim. Air can then pass behind the strip of material, i.e., between the strip of material and the rim itself. This air passes into the rim housing and escapes through the openings of the housing. This air is lost, generating a loss of pressure in the tire.

SUMMARY OF THE INVENTION

An object of the invention is to provide a sealing strip for a rim of a wheel, such as, in particular, a wheel for a tubeless tire, whereby the sealing strip, and the wheel and rim provided with such sealing strip, offers an improved performance with respect to retaining the tire on the rim under pressure, particularly under high pressure.

Additional objects of the invention are to provide a rim of a wheel that incorporates such a sealing strip, as well as a wheel incorporating such rim and sealing strip.

Other objects and advantages of the invention will become apparent from the following description.

The sealing strip according to the invention is provided to be used with a so-called box section rim, or double-walled rim, the rim having a radially outer annular channel provided to receive the tire, the channel being demarcated by an upper bridge with a central well, or groove, bordered with two lateral seats, and two lateral flanges substantially parallel to the radial plane of the rim with two opposing lips at the ends of the flanges. A sealing strip, according to the invention, is formed by a continuous annular layer or strip. The sealing strip has in cross section a generally U-shaped depression to be engaged in the central groove of the rim, two lateral extensions provided to rest on the lateral edges of the rim, and two raised walls provided to rise along the flanges of the rim.

The walls of the sealing strip are extended by two lips that project laterally inwardly of the channel with respect to the walls of the sealing strip, the lips of the sealing strip being provided to be positioned beneath, or not radially beyond, the lips of the flanges of the rim.

In this manner, even if the tire beads were to lose contact with the lateral extensions of the sealing strip, the beads would remain in contact with the additional lips of the sealing strip, with which they are maintained against, which prevents air from escaping between the rim and the sealing strip. In this way, the sealing strip according to the invention improves the sealing, or impermeability, of the tire with respect to the rim.

BRIEF DESCRIPTION OF DRAWINGS

The invention will be better understood with reference to the following description and to the attached drawings that are an integral part thereof.

DETAILED DESCRIPTION OF THE INVENTION

Figure 1:
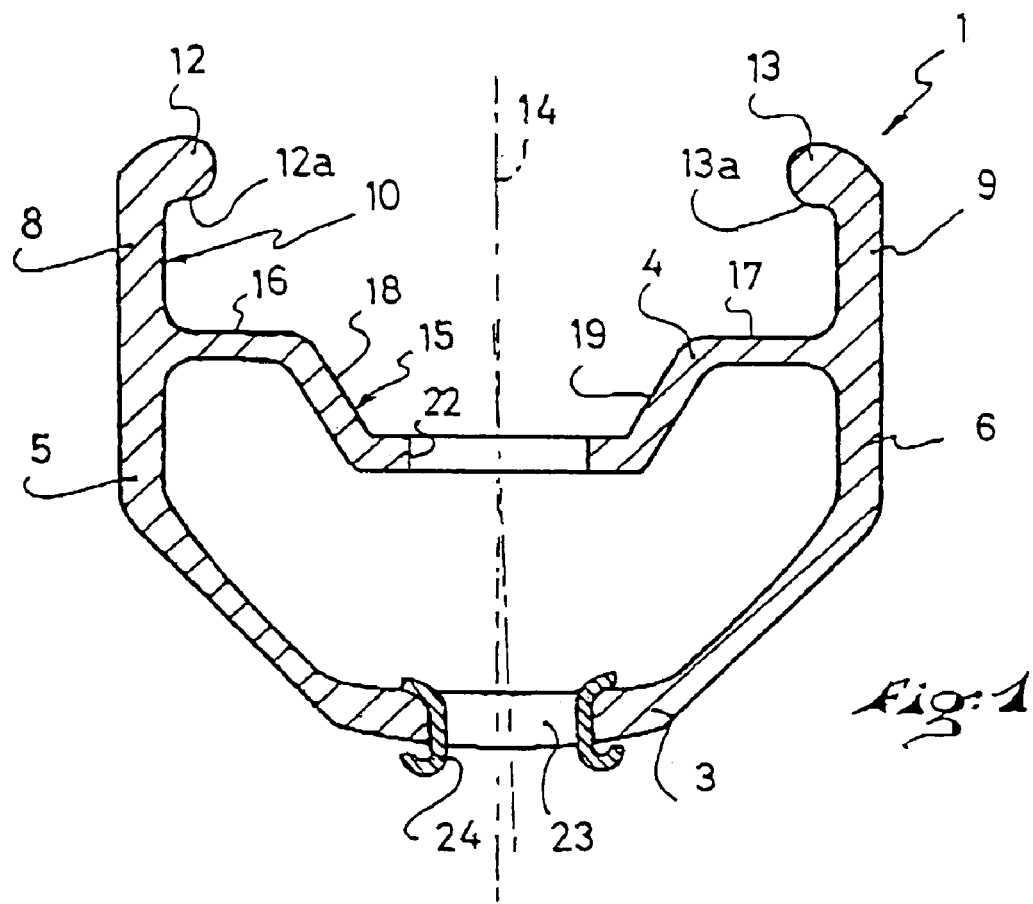
FIG. 1 is a cross-sectional view of a rim in the area of a spoke hole.

FIG. 1 shows a rim 1 in a transverse cross section. Conventionally speaking, the rim 1 is made from a channel-shaped section, such as can be obtained by extrusion, that is cut to a predetermined length and then bent to form a hoop or ring. The two ends of the ring are preferably joined by a welding technique to provide a strong connection in this area. Other methods for joining the ends could also be used.

According to the embodiment shown, the rim 1 has a box structure in transverse cross section. The box is demarcated by a lower bridge 3, an upper bridge 4, and a pair of lateral walls 5 and 6 which connect the two bridges.

The lateral walls are radially extended by flanges 8 and 9. The flanges 8 and 9 define, with the upper bridge 4, an annular channel 10 for receiving the tire.

At their top, as shown in FIG. 1, the flanges 8 and 9 have opposed projections or lips 12 and 13 that close the channel. These lips are provided to retain the lateral walls of the tire mounted upon the rim 1. According to the embodiment shown, each of the lips has a retaining surface 12a, 13a, respectively, that is perpendicular, or substantially perpendicular, to the median plane 14 of the rim 1. This plane is illustrated by a dotted and dashed line in FIG. 1. In other words, the retaining surfaces 12a, 13a face generally radially inwardly (i.e., downwardly in the drawing).

The upper bridge 4 has, in its median portion, a well 15 that forms a radial depression, i.e., an annular groove, in which the tire beads are introduced when the tire is being mounted on the rim. On each side of the well 15 the upper bridge has lateral edges 16 and 17 that provide the junction between the well 15 and the flanges 8 and 9.

According to the embodiment illustrated in FIG. 1, the lateral walls 18 and 19 of the well 15 are inclined and give the well a flared shape.

The form of the upper bridge 4 and that of the rim profile shown in the figures are not limiting, and other forms could also be used. In particular, the lateral walls 18, 19 of the well could have a different orientation, or they could be rounded. One could also have an additional bridge or one or more additional partitions inside of the box. Also, instead of being symmetrical, the rim profile could be asymmetrical.

As can be seen in the cross-sectional plane of FIG. 1, a plurality of openings 22 extend through the upper bridge 4 of the rim 1, and a plurality of openings 23, aligned or paired with the openings 22, extend through the lower bridge 3. In a known manner, the openings 23 are provided as a seat for the spoke nipples that are introduced into the box through the openings 22. The openings 23 can be alternatively offset on both sides of the median plane of the rim with respect to the direction of the spokes once the wheel is assembled.

In order to improve the retention of the spoke nipple, an eyelet 24 is crimped in each of the openings 23. These are single eyelets. However, this is not limiting, and one could use double eyelets that connect the two bridges, or even use no eyelet at all.

Figure 2:
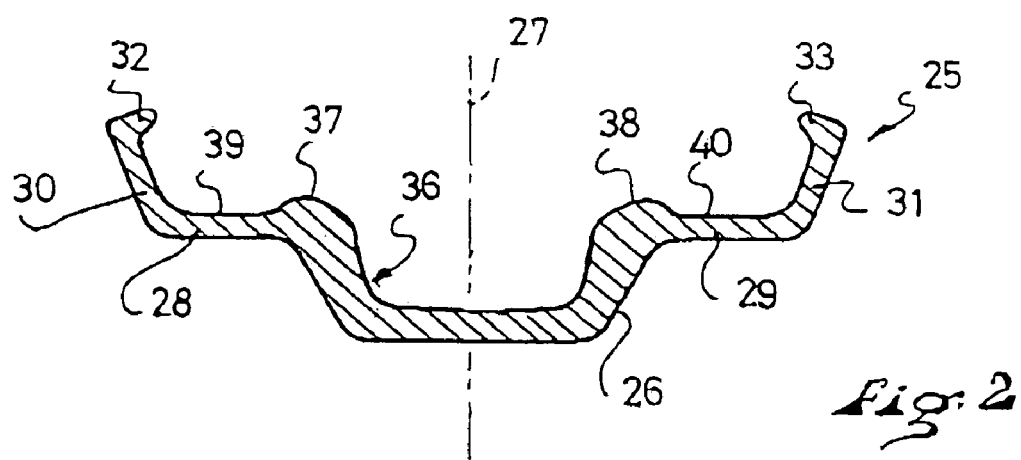
FIG. 2 shows in a transverse cross section a sealing strip provided to cooperate with the rim of FIG. 1.

The sealing strip 25 provided to be used with the rim of FIG. 1 is shown in FIG. 2 in transverse cross section.

The sealing strip 25 is provided to line the inside of the annular channel of the rim 1. On the outside, i.e., toward the top of FIG. 2, the sealing strip has a first shape provided to receive the tire, and on the interior, i.e., toward the bottom of FIG. 2, the sealing strip has a second shape provided to hug, i.e., to closely follow, the contour of the upper bridge 4 of the rim 1.

The sealing strip 25 is formed by an air impermeable continuous layer that is relatively flexible, i.e., elastically deformable and sufficiently elastic in extension to facilitate its mounting on the rim. Another property of the material of the sealing strip is its temperature stability for resisting the heating of the rim that could occur during an extended period of braking.

For example, the sealing strip 25 can be made from a thermoplastic material, such as polypropylene. Other materials could also be used, particularly rubber, including synthetic rubber materials.

Preferably, the strip to be used for the sealing strip is manufactured by injection in a mold, without an apparent molding joint in the channel for receiving the tire. For instance, the mold has a fixed portion that provides the outer contour, and a movable portion that gives the inner contour. In this manner, the plane of the mold joint is on the inside of the strip. The flexibility of the strip facilitates its demolding, i.e., its removal from the fixed portion of the mold.

With reference to FIG. 2, the sealing strip 25 has a median depression 26 that is bordered by lateral extensions 28 and 29. The extensions 28, 29 are extended upwardly in the figure by walls 30, 31. At their upper ends, the walls 30, 31 have projecting lips 32, 33 that are oriented one toward the other in the direction of the median plane 27 of the sealing strip 25, i.e., the lips 32, 33 extend laterally inwardly from respective ones of the walls 30, 31. The plane 27 is illustrated by the dotted and dashed line in FIG. 2.

Figure 3:
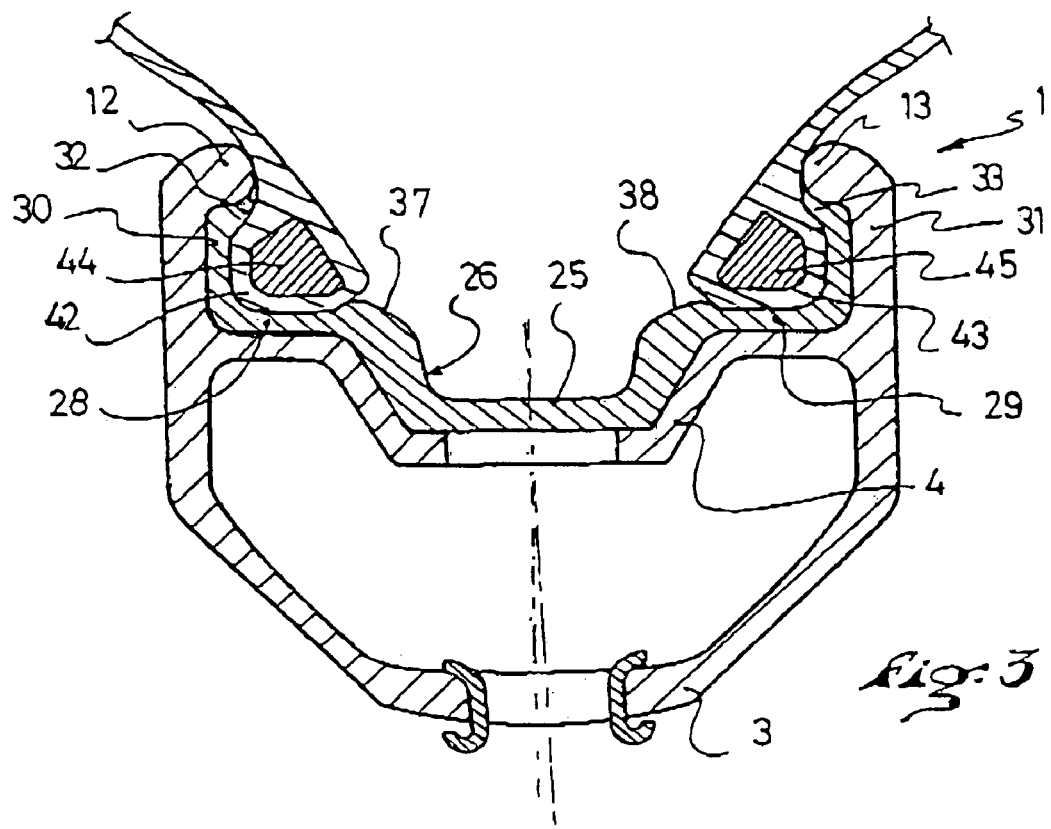
FIG. 3 shows in a transverse cross section the sealing strip positioned in the annular channel of the rim.

The dimensions of the strip are determined so that, as seen in FIG. 3, the sealing strip 25 is positioned in the annular channel of the rim 1 and, in particular, so that the lips 32 and 33 are housed under, or radially inward of, the lips 12 and 13 of the rim. Thereby, like the retaining surfaces 12a, 13a of the rim 1, the lips 32, 33 of the sealing strip have retaining surfaces that face generally radially inwardly (i.e., downwardly in the drawing).

Figure 4:
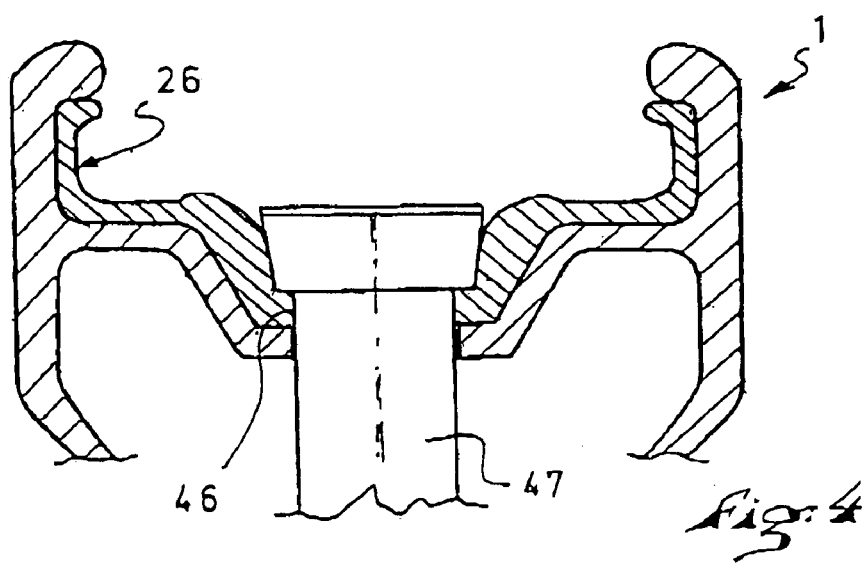
FIG. 4 relates to a first method for assembling the valve.

In addition, the lips 32, 33 of the sealing strip are deformed upwardly from a first position (before the tire is mounted on the rim as shown in FIG. 2 or 4) to a second position wherein the lips 32, 33 are positioned between the tire beads 42, 43 and the lips 12, 13 of the rim 1, respectively.

In this manner, the sealing strip 25 lines the annular channel, including the base of the lips, for retaining the tire. Under these circumstances, the seal/impermeability of the tire is improved.

Indeed, it has been found that for tires having beads that are not very rigid in extension or that are poorly adjusted to the nominal diameter of the rim, the tire beads are retained only by the lips when the pressure inside of the tire is relatively high. The presence of the lips 32, 33 of the sealing strip 25 under the lips 12, 13 of the flanges of the rim maintains the seal, i.e., the impermeable contact, between the tire and the sealing strip 25, and prevents air from escaping between the sealing strip 25 and the rim itself.

Preferably, the lips 32, 33 of the sealing strip 25 do not extend radially beyond the lips 12, 13 of the rim, so as not to interfere with the passage of the walls of the tire when the tire is mounted or dismounted, and so as not to be damaged by a tire-removing tool during these operations.

According to the illustrated embodiment, the sealing strip 25 is manufactured with flared walls 30 and 31 so that when the sealing strip 25 is positioned in the rim 1, these walls 30, 31 are properly pressed against the flanges 8, 9 of the rim, due to the natural elasticity of the strip. It is provided to manufacture the strip with walls that are inclined outwardly by approximately 20° with respect to the median plane of the sealing strip.

The sealing strip 25 shown has an inner shape that hugs, or closely follows, the contour of the annular channel of the rim, and an outer shape that facilitates the mounting, inflating, and positioning of the tire onto the rim.

Thus, the median depression 26, the lateral extensions 28, 29 and the walls 30 and 31 have a form and dimensions provided to hug the outer profile of the well 15, the edges 16 and 17, and the flanges 8 and 9, respectively. In particular, the lateral walls of the depression 26 are flared to hug the flared form of the lateral walls 18 and 19 of the well 15.

As mentioned previously, the height of the lips 32 and 33 is such that their top is at the level of, or recessed from, the lips 12 and 13 of the rim 1. In the embodiment shown, the lips project by a predeterminate amount, such as 0.85 millimeters, with respect to the walls 30 and 31. This value is only exemplary and is not considered to be limiting of the broader scope of the invention.

Preferably, the lips 32, 33 have on the outside a support surface oriented perpendicularly, or substantially perpendicularly, with respect to the general direction of the walls 30, 31. Furthermore, the lips 32, 33 have a cross section that becomes narrower in the direction of the median plane 27.

It is contemplated, according to the invention, that the outer profile of the strip of the sealing strip 25 can have an overall form that is consistent with what is described in the patent document FR 2 766 419 and U.S. Pat. No. 6,257,676, the latter of which is hereby incorporated by reference thereto, in its entirety, for this purpose. Thus, the profile has a narrow and recessed well, or radial groove, 36. The depth of the groove 36 is provided to allow the mounting of the tire, particularly the clearing of the flange by means of which the tire is mounted. The width of the groove 36 is determined depending on the thickness of the tire beads so that once they are mounted in the groove, the two tire beads can be pressed one against the other. Preferably, the lateral edges that demarcate the groove 36 are slightly flared. In this manner, at the beginning of the inflation stage, the air is allowed to remain confined in the tire, even if the inflation is carried out with a pump having a low output, such as a light-duty pump. As the pressure in the tire increases, the tire beads rise along the lateral edges of the groove.

The groove 36 is bordered by two ridges 37 and 38 that form maximum diameter zones that the tire beads must clear under the effect of the air pressure.

Beyond the ridges, the strip has seats 39, 40 on which the tire beads rest after having cleared the ridges.

According to the embodiment shown, the ridges project 0.6 millimeters, or approximately 0.6 millimeters, along a radial direction with respect to the seats 39, 40. This value is only exemplary, is given only as a guide, and is not considered to be limiting of the broader scope of the invention.

When the sealing strip 25 is mounted on the rim 1, as shown in FIG. 3, the diameter measured in the area of the seats 39 and 40 defines the nominal diameter of the wheel. This diameter has a standardized value to allow for compatibility between the wheels and the tires. The diameter of the tire in the area of its beads that are shown as 42, 43 and 44, 45, respectively, in FIG. 3 is provided depending on this nominal diameter.

Thus, the invention provides manufacturing the rim with a diameter in the zone of the seats which is less than the nominal diameter by twice the thickness of the sealing strip in order to get back the nominal diameter once the sealing strip is installed on the rim. In the embodiment shown, the diameter of the rim in the area of the seats is decreased by 2 millimeters with respect to the nominal diameter, and the rim base has a thickness of 1 millimeter in this zone.

For the valve, several methods of assembly can be appropriate.

According to a first method for assembly shown in FIG. 4, the sealing strip has, at the base of its depression or well, an opening 46 with a diameter that is equal to or slightly smaller than the diameter of the valve 47 to avoid any clearance between the rim base and the valve in this zone.

A valve 47 according to what is described in the patent document FR 2 787 064 is inserted into the opening. This valve has a body and a head with an impermeable coating.

Figure 5:
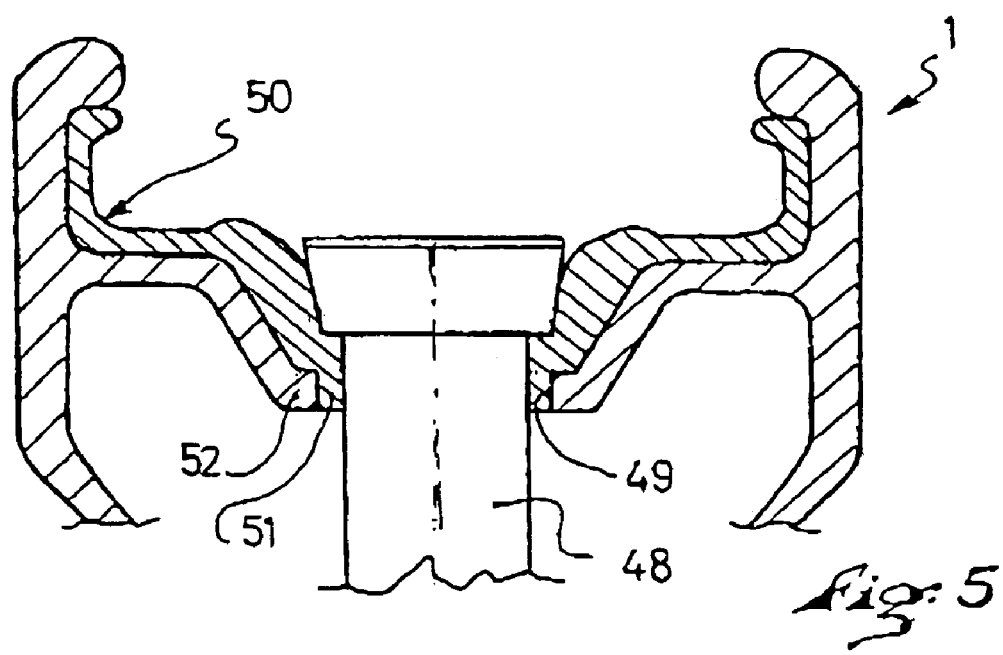
FIG. 5 schematically shows another method for assembling the valve.

Another method for assembling a valve 48 is shown schematically in FIG. 5. In the area of the hole 49 for the valve of the rim, the sealing strip 50 has a flange 51 that projects over a height equal to or greater than the thickness of the bridge 52 in the zone of the hole 49.

The flange 51 is engaged in the hole 49. It ensures a mechanical connection of the sealing strip 50 to the rim itself in the zone of the valve. There is also an improved impermeability in the area of the valve.

According to another method of construction, one could assemble the valve body to the sealing strips according to an impermeable assembly, or a mechanical type assembly, or by overmolding the valve body onto the sealing strip.

A wheel, according to the invention, includes a rim connected to a central hub via a plurality of spokes, for example, as shown in FIG. 1 of U.S. Pat. No. 6,257,676, which is incorporated-by-reference thereto in its entirety for this purpose, with the rim being equipped with a sealing strip in the manner disclosed herein.

Figure 6:
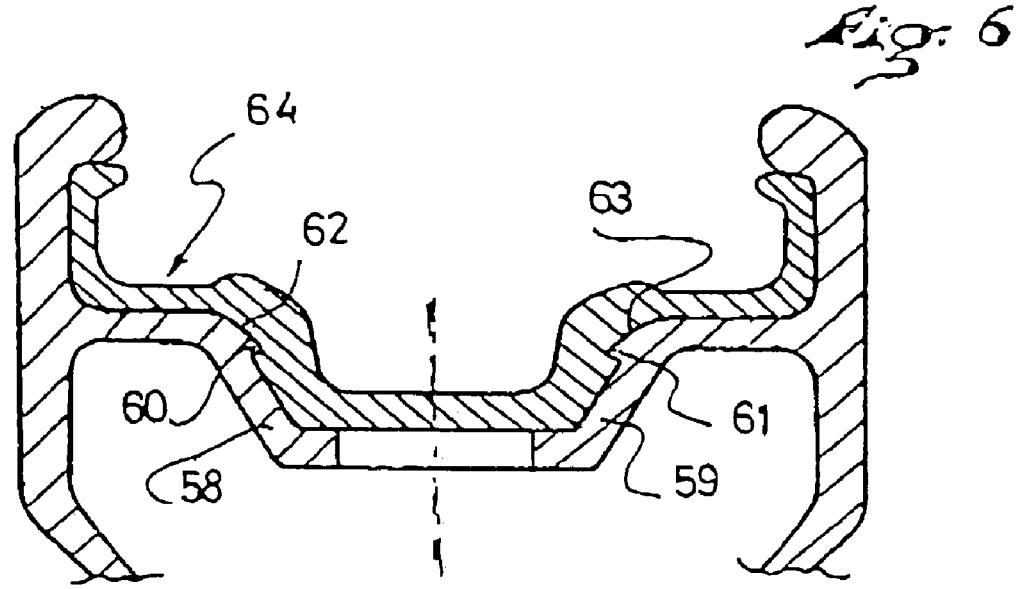
FIG. 6 relates to an alternative embodiment of the invention.

FIG. 6 pertains to an alternative construction of the rim and sealing strip.

According to this alternative, the lateral walls 58 and 59 of the rim well have a projecting circular ridge 60, 61. The ridges are housed in a correspondingly formed groove 62, 63 that is in the lateral edges of the sealing strip 64 opposite the ridges. The ridge and the groove contribute to improving the mechanical connection between the sealing strip and the rim along a transverse direction. The ridge and the groove can have a serrated profile, as shown in the figure, as an optional construction, to facilitate positioning of the sealing strip 64 onto the rim and to prevent sliding.

An inverted arrangement of the ridges and grooves can also be used.

Figure 7:
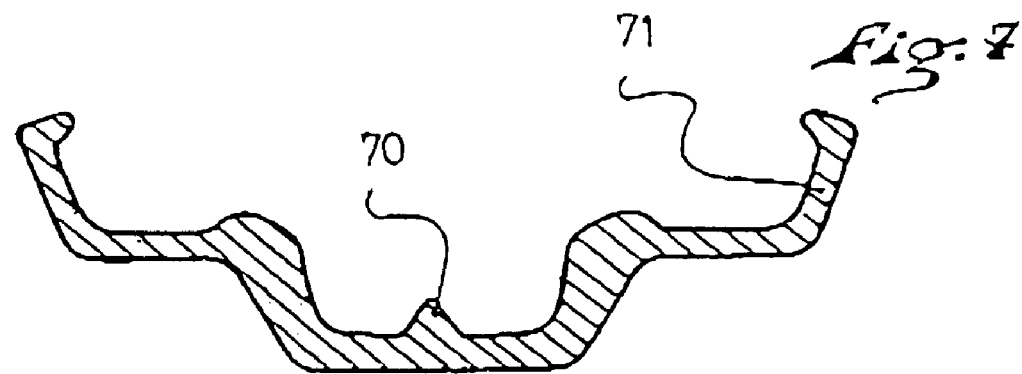
FIG. 7 shows in cross section an alternative construction.

FIG. 7 shows a sealing strip 71 that provides another alternative of the sealing strips heretofore disclosed. In this alternative, a central rib 70 is provided which projects radially from the base of the groove of the sealing strip. The central rib stiffens the structure of the sealing strip 71. In cross section, the rib has any appropriate form and, optionally, it has a tapered form as shown in the figure.

Figure 8:
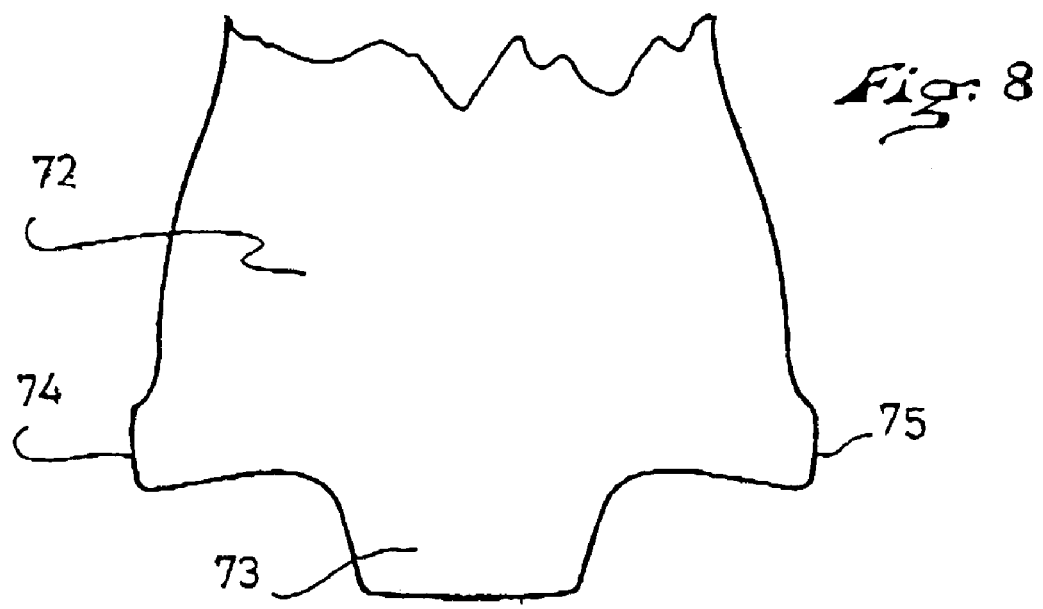
FIG. 8 shows a tool for positioning the sealing strip.

FIG. 8 shows, in a front view, the head 72 of a tool provided to facilitate the positioning of a sealing strip according to the invention in the rim. The head 72 of the tool has a centering extension 73 and two lateral extensions 74 and 75. After a rough positioning of the sealing strip in the rim, the tool is presented obliquely, with the centering extension engaged in the groove of the sealing strip.

Then the tool is oriented transversely, after which it is displaced along the perimeter of the rim. The lateral extensions 74, 75 press the raised portions of the sealing strip against the lateral flanges of the rim. Additionally, the lateral extensions are engaged under the lips of the sealing strip that they force into proper position under the projections of the rim.

This description is given only by way of example and other embodiments of the invention could be used without leaving the scope thereof.

What is claimed is:

1. A sealing strip for a rim of a wheel, the sealing strip being adapted to be positioned upon an outer annular channel of the rim, the outer annular channel being adapted to have a tire mounted thereon, the outer annual channel having an upper bridge with a central well bordered by opposite lateral edges and a pair of opposite lateral flanges substantially parallel to a radial plane of the rim, with the lateral flanges having laterally opposed lips on upper ends of the flanges, said sealing strips comprising:
    a continuous annular strip;
    in cross section, the annular strip of the sealing strip comprising:
        a generally U-shaped groove having a shape to adapt the sealing strip to be engaged in a central well of the rim;
        two lateral extensions extending laterally outwardly from said groove adapted to lie upon the opposite lateral edges of the rim;
        two walls extending generally radially from said lateral extensions, said two walls adapted to be positioned along the lateral flanges of the rim;
        two lips extending laterally inwardly from respective ones of said two walls, said two lips of the sealing strip adapted to be positioned radially inward and beneath the laterally opposed lips of the upper ends of the flanges of the rim, each of said two lips of the sealing strip having a generally radially inwardly facing tire retaining surface.

2. A sealing strip according to claim 1, wherein:
said lips of the flanges of the rim include uppermost ends;
said lips of the sealing strip have uppermost ends positioned at a height, with respect to a cross section of the sealing strip, to adapt the lips of the sealing strip to be positioned no higher than said uppermost ends of the lips of the flanges of the rim.

3. A sealing strip according to claim 1, wherein:
each of said lips of the sealing strip has an exterior support surface oriented substantially perpendicular to a general direction of said walls of the sealing strip.

4. A sealing strip according to claim 1, wherein:
each of said lips of the sealing strip has a cross section that narrows in a direction extending toward a median plane of the sealing strip.

5. A sealing strip according to claim 1, wherein:
each of said lips of the sealing strip projects approximately 0.85 millimeters from a respective inner surface of one of said walls of the sealing strip.

6. A sealing strip according to claim 1, wherein:
said U-shaped groove is formed by lateral walls having grooves or ridges adapted to connect mechanically with ridges or grooves, respectively, of the central well of the rim.

7. A sealing strip for a rim of a wheel, the sealing strip being adapted to be positioned upon an outer annular channel of the rim, the outer annular channel being adapted to have a tire mounted thereon, the outer annual channel having an upper bridge with a central well bordered by opposite lateral edges and a pair of opposite lateral flanges substantially parallel to a radial plane of the rim, with the lateral flanges having laterally opposed lips on upper ends of the flanges, said sealing strip comprising:
    a continuous annular strip;
    in cross section, the annular strip of the sealing strip comprising:
        a generally U-shaped groove having a shape to adapt the sealing strip to be engaged in the central well of the rim, said groove of the sealing strip having a projecting rib;
        two lateral extensions extending laterally outwardly from said groove adapted to lie upon the opposite lateral edges of the rim;
        two walls extending generally radially from said lateral extensions, said two walls adapted to be positioned along the lateral flanges of the rim;
        two lips extending laterally inwardly from respective ones of said two walls, said two lips of the sealing strip adapted to be positioned radially inward and beneath the laterally opposed lips of the upper ends of the flanges of the rim.

8. A sealing strip according to claim 7, wherein:
said projecting rib has a shape, in cross section, tapering in a direction extending radially outward from the sealing strip.

9. A sealing strip according to claim 1, further comprising:
a valve hole bordered with a flange, said flange projecting in a direction radially inward of the sealing strip.

10. A rim for a wheel, said rim comprising:
an outer annular channel, said outer annular channel comprising:
    a pair of lateral flanges, said lateral flanges comprising a pair of laterally opposed lips, a respective one of said pair of lips on each of radially outer ends of said flanges;
    a bridge extending between said pair of lateral flanges, said bridge comprising a pair of lateral edges extending inwardly from said lateral flanges toward a median plane of the rim and a well extending radial inwardly from said lateral edges;
a sealing strip, separate from said outer annular channel, positioned within said outer annular channel, said sealing strip comprising:
    a depression positioned over said well of said bridge of said annular channel, said depression containing a radial groove adapted to receive a pair of beads of a tire;
    a pair of lateral extensions extending laterally outwardly from said depression of said sealing strip, said lateral extensions positioned over said lateral edges of said bridge;
    a pair of walls extending radially from said lateral extensions, said pair of walls being positioned along said lateral flanges of said annular channel;
    a pair of lips extending laterally inward from respective ones of said two walls, said pair of lips of said sealing strip being positioned radially inward of, and not radially outward beyond, said pair of lips of said lateral flanges of said annular channel, each of said pair of lips of the sealing strip having a generally radially inwardly facing tire retaining surface.

11. A rim according to claim 10, wherein:
said lips of said sealing strip have radially outermost ends positioned no further radially than outermost ends of said lips of said flanges of said annular channel.

12. A rim according to claim 10, wherein:
each of said lips of said sealing strip has an exterior support surface oriented substantially perpendicular to a general direction of said walls of said sealing strip.

13. A rim according to claim 10, wherein:
each of said lips of said sealing strip has a cross section that narrows in a direction extending toward a median plane of said sealing strip.

14. A rim according to claim 10, wherein:
each of said lips of said sealing strip projects approximately 0.85 millimeters from a respective inner surface of one of said walls of said sealing strip.

15. A rim according to claim 10, wherein:
said well of said annular channel includes a pair of lateral walls having ridges or grooves;
said depression of said sealing strip includes a pair of lateral walls having grooves or ridges provided for a mechanical connection with said ridges or grooves, respectively, of said annular channel.

16. A rim for a wheel, said rim comprising:
an outer annular channel, said outer annular channel comprising:
  a pair of lateral flanges, said lateral flanges comprising a pair of laterally opposed lips, a respective one of said pair of lips on each of radially outer ends of said flanges;
  a bridge extending between said pair of lateral flanges, said bridge comprising a pair of lateral edges extending inwardly from said lateral flanges toward a median plane of the rim and a well extending radial inwardly from said lateral edges;
a sealing strip, separate from said outer annular channel, positioned within said outer annular channel, said sealing strip comprising:
  a depression positioned over said well of said bridge of said annular channel, said depression containing a radial groove adapted to receive a pair of beads of a tire, said depression of said sealing strip having a projecting rib extending radially from said groove;
  a pair of lateral extensions extending laterally outwardly from said depression of said sealing strip, said lateral extensions positioned over said lateral edges of said bridge;
  a pair of walls extending radially from said lateral extensions, said pair of walls being positioned along said lateral flanges of said annular channel;
  a pair of lips extending laterally inward from respective ones of said two walls, said pair of lips of said sealing strip being positioned radially inward of, and not radially outward beyond, said pair of lips of said lateral flanges of said annular channel.

17. A rim according to claim 16, wherein:
said projecting rib has a shape, in cross section, tapering in a direction extending radially outwardly from said sealing strip.

18. A rim according to claim 10, further comprising:
a valve hole bordered with a flange, said flange projecting in a direction radially inward of said sealing strip.

19. A wheel comprising said rim of claim 10.

20. A wheel according to claim 19, further comprising:
a plurality of spokes mounted in openings within said rim.

21. A sealing strip according to claim 1, wherein:
each of the two lips consists of a single continuous lip extending around said annular strip.

22. A rim according to claim 10, wherein:
each of said pair of lips of said sealing strip consists of a single continuous annular lip.

23. A sealing strip according to claim 1, wherein:
each of the two lips comprises a synthetic rubber or thermoplastic material.

24. A rim according to claim 10, wherein:
each of said pair of lips of said sealing strip comprises a synthetic rubber or thermoplastic material.

25. A rim according to claim 10, wherein:
each of said pair of lips of said sealing strip is movable from a first position, prior to a tire being mounted on the rim, to a second position, with a tire mounted on the rim;
in said second position, each of said pair of lips of said sealing strip is deformed radially outward to be positioned between a tire bead and one of the pair of laterally opposed lips of the lateral flanges of the rim.

26. A rim according to claim 25, wherein:
each of said pair of lips of said sealing strip comprises a synthetic rubber or thermoplastic material.

* * * * *